US006250928B1

(12) United States Patent
Poggio et al.

(10) Patent No.: US 6,250,928 B1
(45) Date of Patent: *Jun. 26, 2001

(54) TALKING FACIAL DISPLAY METHOD AND APPARATUS

(75) Inventors: Tomaso A. Poggio, Wellesley; Antoine F. Ezzat, Boston, both of MA (US)

(73) Assignee: Massachusetts Institute of Technology, Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,858

(22) Filed: Dec. 31, 1998

Related U.S. Application Data

(60) Provisional application No. 60/090,769, filed on Jun. 26, 1998, and provisional application No. 60/090,204, filed on Jun. 22, 1998.

(51) Int. Cl.[7] .................................................. G09B 19/04
(52) U.S. Cl. ........................ 434/185; 434/167; 434/169; 345/473
(58) Field of Search .................................. 434/185, 169, 434/167; 345/473

(56) References Cited

U.S. PATENT DOCUMENTS

| | | | |
|---|---|---|---|
| 4,884,972 | * 12/1989 | Gasper | 434/185 X |
| 5,111,409 | * 5/1992 | Gasper et al. | 434/167 X |
| 5,741,136 | * 4/1998 | Kirksey et al. | 434/169 X |
| 5,907,351 | * 5/2000 | Chen et al. | 348/14 X |
| 5,933,151 | * 8/1999 | Jayant et al. | 345/473 |
| 5,938,447 | * 8/1999 | Kirksey | 434/169 X |
| 5,995,119 | 11/1999 | Cosatto et al. | |
| 6,062,863 | * 5/2000 | Kirksey et al. | 434/169 X |
| 6,088,040 | * 7/2000 | Oda et al. | 345/435 X |
| 6,097,381 | * 8/2000 | Scott et al. | 345/302 X |

OTHER PUBLICATIONS

T. Beier and S. Neely, "Feature–Based Image Metamorphosis", *Siggraph '92 Proceedings*, p. 35–42, Chicago, 1992.

JR Bergen and R. Hingorami, "Hierarchial Motion–Based Frame Rate Conversion", *Technical Report, David Sarnoff Research Center*,1990.

D. Beymer, et al., "Example Based Image Analysis and Synthesis", *Technical Report 1431, MIT AT Lab*, 1993.

A. Black and P. Taylor, *The Festival Speech Sysnthesis System*,University of Edinburgh, 1997.

C. Bregler, et al., "Video Rewrite: Driving Visual Speech with Audio", *SIGGRAPH '97 Proceedings*, Los Angeles, 1997,.

M.M. Cohen and D. W. Massaro, "Modeling Coarticulation in Synthetic Visual Speech", *Models and Techniques in Computer Animation*, p. 139–156, Springer–Verlag, Tokyo, 1993.

(List continued on next page.)

*Primary Examiner*—Valencia Martin-Wallace
*Assistant Examiner*—Chanda Harris
(74) *Attorney, Agent, or Firm*—Hamilton, Brook, Smith & Reynolds, P.C.

(57) ABSTRACT

A method and apparatus of converting input text into an audio-visual speech stream resulting in a talking face image enunciating the text. This method of converting input text into an audio-visual speech stream comprises the steps of: recording a visual corpus of a human-subject, building a viseme interpolation database, and synchronizing the talking face image with the text stream. In a preferred embodiment, viseme transitions are automatically calculated using optical flow methods, and morphing techniques are employed to result in smooth viseme transitions. The viseme transitions are concatenated together and synchronized with the phonemes according to the timing information. The audio-visual speech stream is then displayed in real time, thereby displaying a photo-realistic talking face.

41 Claims, 9 Drawing Sheets

OTHER PUBLICATIONS

T. Ezzat, "Example–Based Analysis and Synthesis for Images of Human Faces", Master's Thesis, Massachusetts Institute of Technology, 1996.

B.K.P. Horn and B.G. Schnuck, "Determining Optical Flow", *Artifical Intelligence*, 17:185–203, 1981.

M.J. Hunt, et al., "Issues in High Quality LPC Analysis and Synthesis", *Proceedings of Eurospeech '89*, vol. 2, p. 348–351, Paris, 1989.

B. LeGoff and C. Benoit, "A Text–to–Audiovisual–speech Synthesizer for French", *Proceedings of the International Conference on Spoken Language Processing*, Philadelphia, 1996.

J. Olive, et al., "Acoustics of American English Speech: A Dynamic Approach". Springer–Verlag, p. 20; New York, 1993.

K.C. Scott, et al., "Synthesis of Speaker Facial Movement to Match Selected Speech Sequences", *Proceedings of the Fifth Australian Conference on Speech Science and Technology*, 2:620–625, 1994.

S.H. Watson, et al., "An Advanced Morphing Algorithm for interpolating Phoneme Images to Simulate Speech", Unpublished Technical Report, Jet Propulsion Laboratory, California Institute of Technology.

S.E. Chen and L. Williams, "View Interpolation for Image Synthesis", *Siggraph '93 Proceedings*, p. 279–288, Anaheim, California, 1993.

Y. Lee, at al., "Realistic Modeling for Facial Animation", *Siggraph '95 Proceedings*, p. 5–62, Los Angelos, 1995.

A. Montgomery and P. Jackson, "Physical Characteristics of the Lips Underlying Vowel Lipreading Performance", *Journ. Acoustical Society of America*, 73(6):2134–2144, 1983.

E. Owens and B.Blazek, "Visemens Observed by Hearing––Impaired and Normal–Hearing Adult Viewers", *Journ. Speech and Hearing Research*, 28:381–383, 1985.

D. Terzopoulos and K. Waters, "Analysis and Synthesis of Facial Image Sequences using Physical and Anatomical Models", *IEEE Transactions on Pattern Analysis and Machine Intelligence*, 15(5):569–579, 1993.

C.G. Fisher, Confusions Among Visually Perceived Consonants, *Journ. Speech and Hearing Research*, 11:796–804, 1968.

F.I. Parke, "A Parametric Model of Human Faces", Ph.D theisis, University of Utah, 1974.

* cited by examiner

Corpus
(52 words ⇒ 52 visemes ⇒ 16 visemes)

| monopthongs (12) | | consonants (24) | |
|---|---|---|---|
| ii | b<u>ea</u>d | r | <u>r</u>ide |
| i | b<u>i</u>d | l | <u>l</u>ight |
| e | b<u>e</u>d | w | <u>w</u>ide |
| a | b<u>a</u>d | y | <u>y</u>acht |
| o | b<u>o</u>dy | m | <u>m</u>ight |
| aa | f<u>a</u>ther | n | <u>n</u>ight |
| uh | b<u>u</u>d | ng | so<u>ng</u> |
| oo | b<u>au</u>d | b | <u>b</u>ite |
| u | b<u>oo</u>k | d | <u>d</u>og |
| uu | b<u>oo</u>t | g | <u>g</u>et |
| @ | <u>a</u>bout | p | <u>p</u>et |
| @@ | b<u>ir</u>d | t | <u>t</u>ea |
| | | k | <u>k</u>ey |
| | | v | <u>v</u>eal |
| | | dh | <u>th</u>en |
| dipthongs (16) | | z | <u>z</u>eal |
| | | zh | gara<u>g</u>e |
| ou | b<u>oa</u>t | f | <u>f</u>eel |
| ei | b<u>ai</u>t | th | <u>th</u>in |
| au | b<u>ou</u>t | s | <u>s</u>eal |
| ai | b<u>i</u>de | sh | <u>sh</u>ore |
| oi | b<u>oy</u>d | h | <u>h</u>ead |
| e@ | th<u>ere</u> | jh | <u>j</u>eep |
| i@ | n<u>ear</u> | ch | <u>ch</u>ore |
| u@ | m<u>oor</u> | | |

FIG. 2

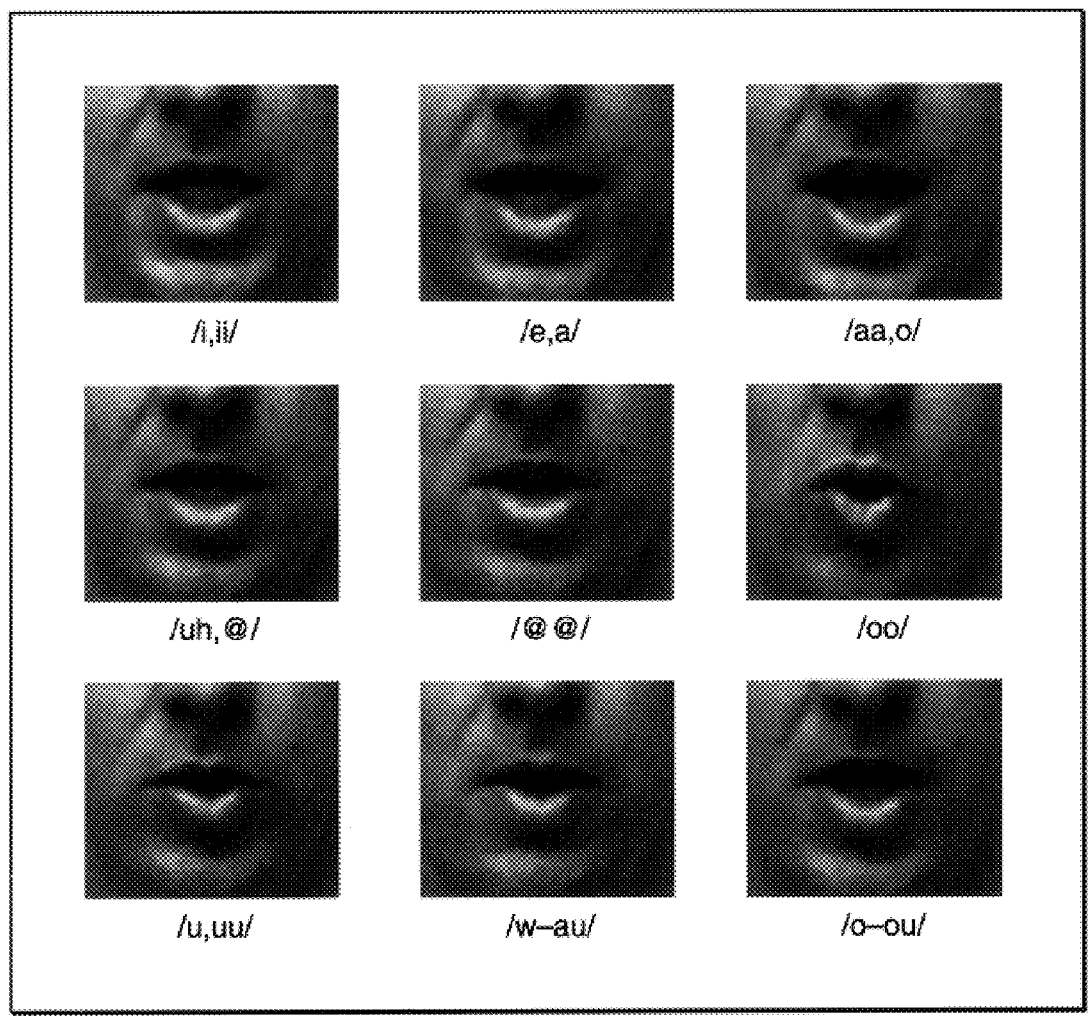
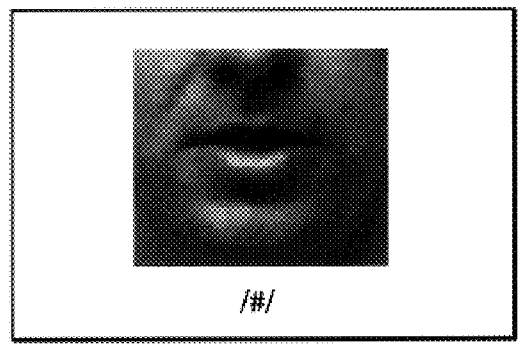
FIG. 4

TALKING FACIAL DISPLAY METHOD AND APPARATUS

RELATED APPLICATIONS

This application is claiming benefit of provisional applications, Ser. No. 60/090,204 filed Jun. 22, 1998 and Ser. No. 60/090,769 filed Jun. 26, 1998, the entire teachings of which are incorporated herein by reference.

GOVERNMENT SUPPORT

The invention was made with government support under Grant Number N00014-92-J-1879 awarded by the Navy and Grant Number ASC-9217041 awarded by the National Science Foundation. The Government has certain rights in the invention.

BACKGROUND OF THE INVENTION

There has been an increased interest recently in the development of text-to-audio-visual speech synthesis (TTAVS) systems, in which standard text-to-speech (TTS) synthesizers are augmented with a visual component thereby taking on the form of an image of a talking face. This interest is driven by the possible deployment of the systems as visual desktop agents, digital actors, and virtual avatars. In addition, these TTAVS systems may also have potential uses in very low bandwidth video conferencing and special effects, and would also be of interest to psychologists who wish to study visual speech production and perception.

An important aspect which might be desired of these facial TTAVS systems is video realism: the ability of the final audio-visual output to look and sound exactly as if it were produced by a real human face that was recorded by a video camera.

Unfortunately, much of the recent work in this field falls short of producing the impression of video realism. The reason for this, the inventors believe, is that most of the current TTAVS systems have chosen to integrate 3D graphics-based facial models with the audio speech synthesis. See M. M. Cohen and D. W. Massaro, "Modeling coarticulation in synthetic visual speech," in *Models and Techniques in Computer Animation*, pages 139–156, N. M. Thalmann and D. Thalmann, editors, Springer-Verlag, Tokyo, 1993. See also B. LeGoff and C. Benoit, "A text-to-audio-visual speech synthesizer for french," in *Proceedings of the International Conference on Spoken Language Processing (ICSLP)*, Philadelphia, USA, October 1996. Although it is possible to improve visual realism through texture-mapping techniques, it seems that there is an inherent difficulty in modeling both the complex visual appearance of a human face and the underlying facial mouth movement dynamics using 3D graphics-based methods.

Besides the underlying facial mouth movement dynamics problems, there is difficulty in constructing a visual speech stream, where it is not sufficient to simply display the viseme images in sequence. Doing so would create the disturbing illusion o very abrupt mouth movement, since the viseme images differ from each other in shape significantly. Consequently, a mechanism of transitioning from each viseme image to every other viseme image is needed and this transition must be smooth and realistic. This need prompted a study in what is known as morphing, which is a technique adopted to create smooth and realistic viseme transitions.

Morphing was first popularized by Beier & Neely, see T. Beier and S. Neely, "Feature-based Image Metamorphosis", in *SIGGRAPH '92 Proceedings*, pages 35–42, Chicago, Ill., 1992, in the context of generating transitions between different faces for Michael Jackson's Black or White music video. The transformations between images occur as a warp of the first image into the second, a similar inverse warp of the second image into the first, and a final cross-dissolve or blend of the warped images. It should be noted that those involved in the early studies noticed the viability of using morphing as a method of transitioning between various facial pose, expression, and mouth position imagery.

The difficulty with traditional morphing approaches is that the specification of the warp between the images requires the definition of a set of high-level features. These features serve to ensure that the warping process preserves the desired correspondence between the geometric attributes of the objects to be morphed. For example, if one were morphing between two faces, one would want the eyes in one face to map to the eyes in the other face, the mouth in one face to map to the mouth in the other face, and so on. Consequently, the correspondence between these eyes and mouth features would need to be specified.

When morphing/warping is done by hand, however, this feature specification process can become quite tedious and complicated, especially in cases when a large amount of imagery is involved. In addition, the process of specifying the feature regions usually requires hand-coding a large number of ad-hoc geometric primitives, such as line segments, corner points, arches, circles, and meshes. Beier & Neely, in fact, make the explicit statement that the specification of the correspondence between images constitutes the most time-consuming aspect of the morph. Therefore, there is a need to automate and improve this traditional method of morphing as it is utilized in making a photo-realistic talking facial display.

SUMMARY OF THE INVENTION

The current invention alleviates problems of producing the impression of the photo-realistic talking face by starting with a human-subject video image rather than a computer generated 3D model and applying techniques to make the human-subject appear photo-realistic when synchronized with input text. In addition, the time-consuming causes in previous morphing techniques have been eliminated through use of optical flow methods and implemented in the current invention.

The present invention provides a method and apparatus of converting input text into an audio-visual speech stream resulting in a talking face image enunciating the text. The audio-visual speech stream contains phoneme and timing information. The talking face image is built using visemes, where these visemes are defined by a set of images spanning a large range of mouth shapes derived from a recorded visual corpus of a human-subject. The present invention method of converting input text into an audio-visual speech stream comprises the steps of (i) recording a visual corpus of a human-subject, (ii) building a viseme interpolation database, (iii) and synchronizing the talking face image with the text stream. The database is filled with a subset of visemes from recorded visual corpus and at least one set of interpolation vectors that define a transition from each viseme image to every other viseme image.

In a preferred embodiment, the transitions are automatically calculated using optical flow methods and morphing techniques are employed to result in smooth viseme transitions. The viseme transitions are concatenated together and synchronized with the phonemes according to the timing information. The audio-visual speech stream is then displayed in real time, thereby displaying a photo-realistic talking face.

In another embodiment of the present invention, the human-subject enunciates a set of key words, where the set of key words is specifically designed to elicit at least on( instantiation of each viseme. The set of enunciating the key words comprises the step o enunciating between 40 and about 50 words from the english language. In a further embodiment of the present invention, recording a visual corpus of a human-subject results in an optical recording of a three dimensional image of the human-subject, where the three dimensional image recording has a plurality of three dimensional image properties capable of being altered. Three dimensional image properties are selected from a group consisting of lighting, shadowing, depth of field, focus, sharpness, color balance, grey scale, saturation, brightness, field of view, and cropping.

In a preferred embodiment of the invention method, building a viseme interpolation database comprises the steps of (i) identifying each viseme as corresponding to a phoneme and (ii) extracting a plurality of visemes from the visual corpus. Identifying each viseme comprises the steps of searching through said recording and relating each viseme on each recorded frame of the recording to a phoneme. In an embodiment of the present invention, the steps of searching and relating are performed manually. Relating each viseme comprises the steps of subjectively rating each viseme and phoneme combination and selecting a final set of visemes from among said rated viseme and phoneme combinations. The invention method further comprising the step of attaching attributes to each viseme, where the attributes define characteristics of the human-subject. Characteristics of the human-subject are selected from a group consisting of eye position, eyelid position, head angle, head tilt, eyebrow position, shoulder position, posture, overall position within the frame. Such attributes are used to separate the visemes into a plurality of viseme sets. The plurality of viseme sets contain about the same visemes. The plurality of viseme sets also facilitate a reduction of repetitive movements, thereby resulting in giving the impression of a more photo-realistic talking face. The present invention further comprises the step of logging the plurality of visemes to a recording medium. And, extracting a plurality of visemes from the visual corpus results in at least one set of 16 visemes. A set of interpolation vectors define two hundred fifty-six viseme transitions. In a preferred embodiment of the present invention, the viseme transitions are non-linear, wherein the non-linear viseme transitions produce smooth dynamics between viseme images for a more photo-realistic talking face.

The present invention apparatus is a system for generating and displaying a talking facial display. The system comprises a computer, an image source in electrical communication with the computer, a text data source in electrical communication with the computer to transfer input text to the computer, and audio-visual routines executing on the computer to manipulate the input images of the human-subject and to display the images synchronously with audio generated from the input text to give the appearance that a talking face is speaking the input text. The present invention apparatus further comprises an audio input source in electrical communication with the computer to transfer words spoken by the human-subject into the computer for processing by the audio-visual routines to obtain voice information used to generate the audio output from the input text. The audio input source and the image source are comprised of a video camera that captures audio and video of the human-subject speaking words.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a table of the recorded visual corpus employed by the present invention.

FIG. 4 shows seven visemes representing twelve monophthong phonemes, two diphthong visemes used to complete the vowel nuclei (other vowels being represented by monophthong visemes), and one silence viseme.

DETAILED DESCRIPTION OF THE INVENTION

Figure 1:
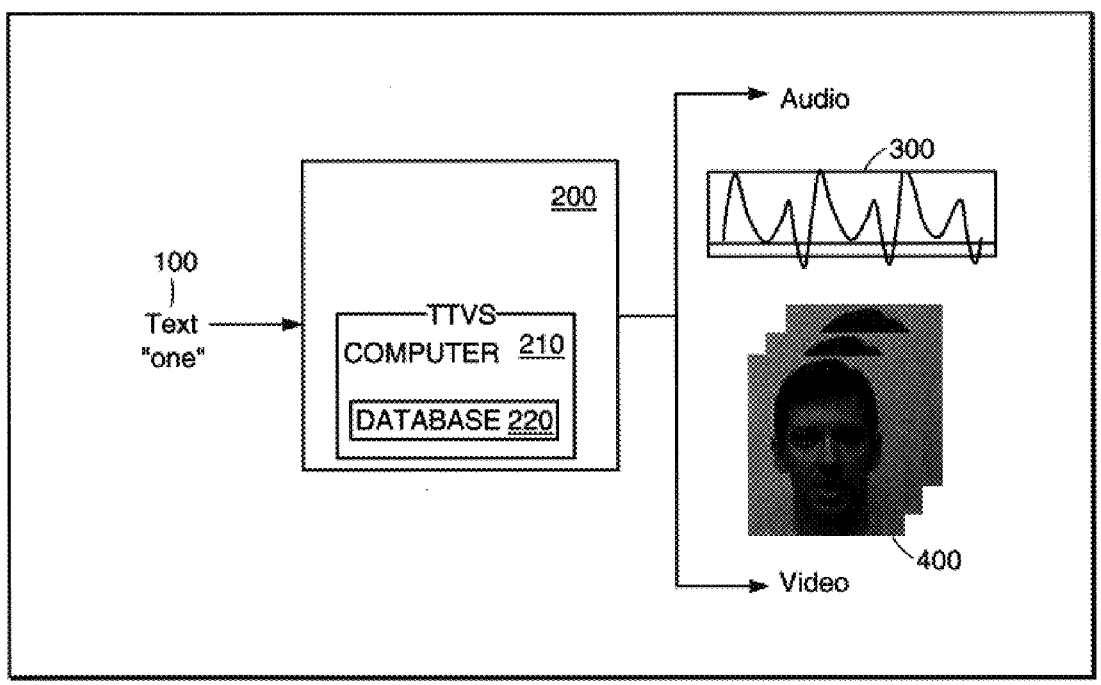
FIG. 1 is an overview of the text-to-audio visual speech (TTVS) system of the present invention.

The current invention comprises computer apparatus having video capability or external video means, a monitor, video operating controls, sufficient memory to operate on recorded video imagery, sound capability, sufficient speed for real time video and sound playback, and means for inputting or receiving input text. FIG. 1 shows an overview of the TTVS 200 system of this invention. Input text 100 is received by the TTVS 200 system comprising a computer 210. The TTVS 200 system outputs video 400 and audio 300 corresponding to the input text 100 such that a photo-realistic display of a talking face is observed by a person watching the TTVS 200 display. The TTVS 200 system comprises the method of recording a visual corpus of a human-subject used for producing the video 400 portion of the talking face image, creating an interpolation database 220, and synchronizing the talking face image with the text stream by using the information contained in the interpolation database 220.

The apparatus for recording a visual corpus of a human-subject is generally a standard video camera having means for synchronized sound recording. The recorded video 400 images and sound are stored to memory. The memory may be standard memory devices, such as RAM, magnetic disk, magnetic tape, an optical recording means, or other means for storing video and audio to memory. In a preferred embodiment, the visual recording and sound recording are stored in such a way that the two recordings are retrieved in a random access manner synchronously or asynchronously, as a composite image with video or as separate audio 300 and video signals. This retrieval is accomplished through a computer 210 apparatus, such as a Macintosh with a G3 processor having multimedia capabilities. Alternatively, a non-linear video editing system, such as an AVID® system, capable of performing the other functions of the present invention, as described herein, may also be used.

The basic underlying assumption of the facial synthesis approach by the present invention is that the complete set of mouth shapes associated with human speech may be reasonably spanned by a finite set of visemes. The term "viseme" itself was coined initially by Fisher (see C. G. Fisher, "Confusions among visually perceived consonants," Journal of Speech and Hearing Research, 11:796–804, 1968.) as an amalgamation of the words "visual" and "phoneme". To date, there has been no precise definition for the term, but in general it has come to refer to a speech segment that is visually contrastive from another. In this work, a viseme will be defined to be a static lip shaped image that is visually contrastive from another.

Given the assumption that visual speech is spanned by a set of visemes, a good approach would be to design a particular visual corpus which elicits one instantiation for each viseme. The simplest approach to take is to assume a one-to-one mapping between the set of phonemes and the set of visemes and to design the corpus so that there is at least one word uttered which instantiates each phoneme.

This one-to-one strategy is a reasonable approach in light of the fact that the ultimate goal of this invention is to use an underlying TTS system to produce an audio-visual sequence. In doing so, the TTS will produce a stream of phonemes corresponding to the input text 100. Consequently, a mapping is needed from the set of phonemes used by the TTS to a set of visemes so as to produce the visual stream. The one-to-one mapping strategy is also a good idea because most speech text books and dictionaries contain a list of phonemes and example words which instantiate them, and the corpus may be limited to those example words.

However, current literature on viseme research indicates that the mapping between phonemes and visemes is many-to-one. That is, there are many phonemes which, when humanly produced have corresponding lip positions that look alike visually, and hence, fall into the same visemic category. This is particularly true, for example, in cases where two sounds are identical in manner in place of articulation, but differ only in voicing characteristics. For example, \b\ and \p\ are two bilabial stops which differ only in the fact that the former is voiced while the latter is voiceless. This difference, however, does not manifest itself visually, and hence the two phonemes should be placed in the same visemic category. See E. Owens and B. Blazek, "Visemes Observed by Hearing-Impaired and Normal-Hearing Adult Viewers," Journal of Speech and Hearing Research, 28:381–393, September 1985. See also A. Montgomery and P. Jackson,"Physical Characteristics of the Lips Underlying Vowel Lipreading Performance," Journal of Acoustical Society of America, 73(6):2134–2144, 1983.

Conversely, the literature points out that the map from phonemes to visemes is also one-to-many: the same phoneme may have many corresponding lip positions with different visual forms. This phenomenon is termed coarticulation, and it occurs because the neighboring phonemic context in which a sound is uttered influences the lip shape for that sound. For example, the viseme associated with \t\ differs depending on whether the speaker is uttering the word "two" or the word "tea". In the former case, the \t\ viseme assumes a rounded shape in anticipation of the upcoming \uu\ sound while the latter assumes a more spread shape in anticipation of the upcoming \ii\ sound. (See M. M. Cohen and D. W. Massaro, "Modeling Coarticulation in Synthetic Visual Speech," N. M. Thalmann and D. Thalmann, editors, "Models and Techniques in Computer Animation," pages 139–156, Springer-Verlag, Tokyo, 1993. See also E. Owens and B Blazek, "Visemes Observed by Hearing-Impaired and Normal-Hearing Adult Viewers," Journal of Speech and Hearing Research, 28:381–393, September 1985.)

In the present invention, coarticulation effects have been ignored for the sake o simplicity. Consequently, the recorded corpus, shown in FIG. 2, assumes a one-to-one map from phonemes to visemes, and hence one word is uttered for every phoneme. The example words uttered are obtained from Olive, Greenwood, et al. (see J. Olive, A. Greenwood, and J. Coleman, "Acoustics of American English Speech: A Dynamic Approach," Springer-Verlag, N.Y., USA, 1993.), and are generally categorized into example words which instantiate consonantal, monophthong vocalic, and diphthong vocalic phonemes. In other words, in the present invention, the preferred embodiment comprises a human-subject enunciating a set of key words wherein the set of key words are specifically designed to elicit at least one instantiation of each viseme. Where the underlined portion of each example word identifies the target phoneme being recorded; to the left of each example word is the phonemic transcription label being used.

After the whole corpus is recorded and digitized, one lip image is extracted as an instance of each viseme. This leads to the extraction of 52 viseme images in all: 24 representing the consonants, 12 representing the monophthongs, and 16 representing the diphthongs, as indicated in FIG. 2. Since this is an unnecessarily large number of visemes, a preferred embodiment of this invention comprises a reduced viseme set by grouping those visemes that look similar. One method of reducing the viseme set can be performed in a subjective manner, by comparing the viseme images visually to asses their similarity. See E. Owens and B. Blazek,"Visemes Observed by Hearing-Impaired and Normal-Hearing Adult Viewers," Journal of Speech and Hearing Research, 28:381–393, September 1985. See also A. Montgomery and P. Jackson, "Physical Characteristics of the Lips Underlying Vowel Lipreading Performance," Journal of Acoustical Society of America, 73(6):2134–2144, 1983. This grouping step is, in effect a decision to use a many-to-one mapping strategy instead of a one-to-one mapping strategy.

Figure 3:
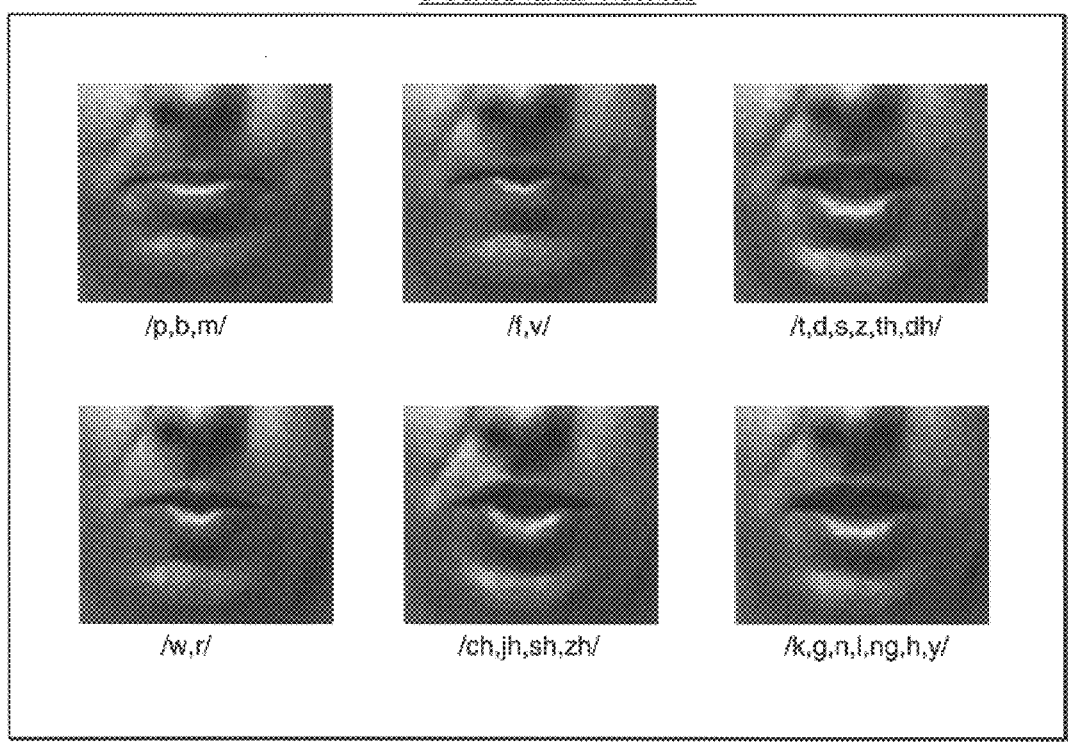
FIG. 3 shows six consonant visemes used to represent the twenty-four consonantal phonemes.

The final reduced set of visemes in the preferred embodiment are shown in FIGS. 3 and 4. As shown in FIG. 3, there are 6 final visemes representing the 24 consonantal phonemes. Shown in the upper half of FIG. 4, there are 7 visemes representing the 12 monophthong phonemes. In the case of diphthongs, all vowel nuclei may be represented by correspondent monophthong visemes, indicated in FIG. 4. The only exception to this occurs in the case of two nuclei: the second nucleus of the \au\ diphthong, which is called the w-au viseme, and the first nucleus of the \o-ou\ diphthong, which is called the \o-ou\ viseme. Finally, one extra viseme is included in the preferred embodiment to represent silence, which is referred to as \#\ and illustrated at the bottom of FIG. 4.

In the preferred embodiment, there are 16 final visemes, as described above. Therefore, referring to FIGS. 2, 3 and 4, for the preferred embodiment for the English language, recording a set of key words comprises the step of filming a human-subject enunciating between 40 and about 50 words from the English language and selectively reducing the full set of visemes from the visual corpus (film recording) to one or more sets of 16 visemes.

In an embodiment of the present invention, the recording of a visual corpus of a human-subject results in an optical recording of a three dimensional image of a human-subject wherein the three dimensional image has three dimensional image properties capable of being altered by means of image processing, for example. The three dimensional image properties may be selected from a group consisting of lighting, shadowing, depth of field, focus, sharpness, color balance, grey scale, saturation, brightness, field of view, and cropping. This three dimensional image of a human-subject adds photo-realism to the talking face image of this invention.

The present invention also comprises building a viseme interpolation database 220 wherein the database 220 comprises a plurality of visemes and at least one set of interpolation vectors that define a transition from each viseme image to every other viseme image. Viseme images in the interpolation database 220 are a subset of the plurality of visemes extracted from the recorded visual corpus (for example, the visemes of FIGS. 3 and 4 discussed above). In a preferred embodiment, the set of interpolation vectors are computed automatically using optical flow methods indicated in FIG. 5 and discussed below.

Optical flow was originally formulated by Horn and Schunck (B. K. P. Horn and B. G. Schunck, "Determining Optical Flow," *Artificial Intelligence,* 17:185–203, 1981.) in the context of measuring the motion of objects in images. This motion is captured as a two-dimensional vector field (Dx, Dy) that describes how each pixel has moved between the viseme images. For this invention, optical flow is important because it allows for the automatic determination of correspondence between images. In addition, since each pixel is effectively a feature point, optical flow allows bypassing the prior art need for hand-coding any ad-hoc feature primitives.

In general, determining optical flow is a highly underconstrained problem, and an additional set of assumptions about the underlying motion need to be made. In the particular case of the optical flow method used in this invention (J. Bergen and R. Hingorani, "Hierarchical Motion-Based Frame Rate Conversion," *Technical report,* David Sarnoff Research Center, Princeton, N.J., Apr. 1990.), one such assumption made is that the motion between images is small. This small motion assumption is extremely detrimental, however, because in many cases it prevents the optical flow method from computing the correspondence between viseme images that exhibit large differences in motion between each other. Consequently, direct application of the optical flow method used in this invention only succeeds when the motion between any two viseme images is small.

However, a flow concatenation procedure (T. Ezzat, "Example-Based Analysis and Synthesis for Images of Human Faces," *Master's thesis,* Massachusetts Institute of Technology, 1996.) overcomes the problems which occur when the small motion assumption fails to apply. Since the original visual corpus is digitized at 30 frames-per-second (fps), there are many intermediate frames that lie between the chosen viseme images. The pixel motions between these consecutive frames are small, and hence the small motion assumption is not violated. Consequently, referring to FIG. 5, a series of consecutive optical flow vectors between each intermediate image and its predecessor is computed by optical flow unit 600 and concatenated into one large flow vector 700 that defines the global transformation between the subject visemes {V1, V2} 500.

When building a viseme interpolation database 220, the steps of identifying each viseme as corresponding to a phoneme and extracting a plurality of visemes from the recorded visual corpus are necessary. Identifying each viseme may be broken down into two steps. The first step is to search through the recording to identify each viseme as corresponding to a single phoneme. The second step is to relate each viseme on each recorded frame of the recording to the phoneme. Using time codes that identify the location on the recording of each viseme and phoneme combination is recommended. In a preferred embodiment, ideally, the steps of searching and relating are performed automatically. In an alternate embodiment, these steps are performed manually. When performing the searching and relating steps manually versus automatically, the differences include subjective identification and time spent performing these steps.

In a preferred embodiment, the step of relating each viseme to a given phoneme also comprises the steps of subjectively rating each viseme and phoneme combination and selecting a final set of visemes from among the rated viseme and phoneme combinations. Subjectively rating each viseme and phoneme combination means to attach a weight of "goodness" to each viseme and phoneme combination in terms of its usability in the final display. That is, when there are repeated visemes that are usable for one or more phonemes, then a subjective determination based on the human-subject's facial expression and expected lip formation is given. The top rated viseme and phoneme combinations are chosen as the representative viseme images for the down-selected group from which the final output video 400 is made.

An embodiment of this invention also comprises the step of attaching attributes to each viseme, where these attributes define characteristics of the human-subject.

These characteristics of the human-subject are selected from a group consisting of eye pupil positions, eyelid positions, head angles, head tilts, eyebrow positions, shoulder positions, postures, and overall positions within the frame. These attributes are used to separate the viseme images into a plurality of viseme sets. A plurality of viseme sets contain about the same visemes; that is, each viseme set contains about the same visemes in terms of mouth positions corresponding to individual phonemes, but also contain similar characteristics of the human-subject. By intelligently selecting visemes from the plurality of viseme sets, one can facilitate a reduction of repetitive movements, thereby resulting in giving the impression of a more photo-realistic talking face. For example, in order to reduce eye blinking, visemes from different sets containing various degrees of eye openings are used so that a viseme having the eyes in a closed position is not constantly used immediately adjacent to a viseme with the eyes widely opened. The same can be said for the eyes looking to the left and to the right, the head angled to the left and to the right, the position the human-subject is sitting within the frame, etc.

Figure 6:
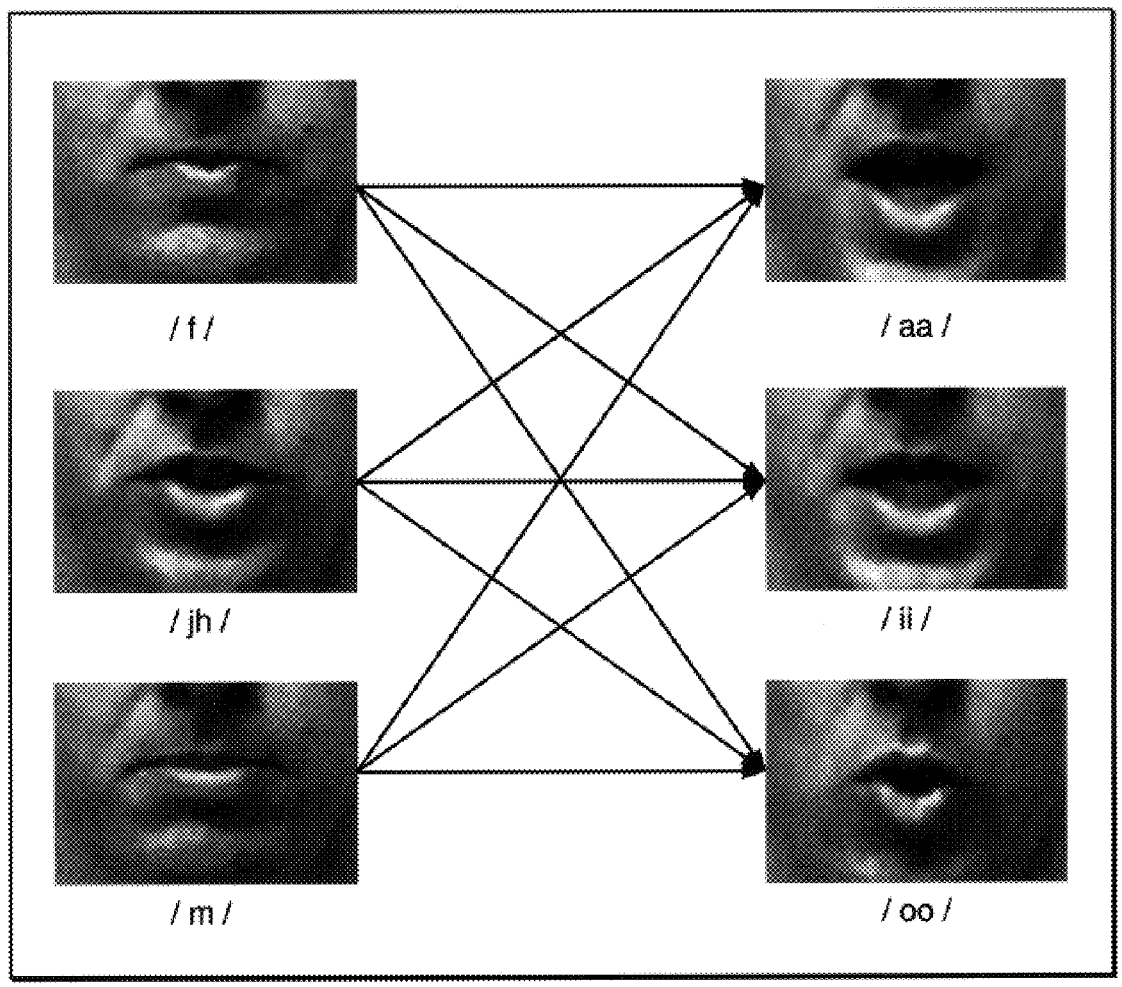
FIG. 6 shows a subset of the flow interpolation vectors contained in an interpolation database of the present invention.

In a preferred embodiment, extracting a plurality of visemes from the visual corpus results in at least one set of 16 visemes, where these 16 visemes are the reduced set of visemes discussed above. Therefore, the set of interpolation vectors contained in the database 220 would comprise 256 viseme transitions, i.e., one transition from each viseme to every other viseme. These transitions between visemes are illustrated in FIG. 6. Again, correspondence from every viseme to every other viseme in the preferred embodiment are computed automatically using optical flow methods.

The step of building a database further comprises the step of logging the plurality of visemes to a recording medium.

These recorded plurality of visemes will ultimately be used in the database 220. The database 220, in the preferred embodiment of the present invention, is stored independently from the visual corpus on a retrievable recording means such as RAM, magnetic media, optical media, etc., similar to the original recorded visual corpus. Ideally, time codes are stored with the visemes such that later retrieval of the visemes may be done quickly, and preferably automatically. Each viseme/phoneme combination is given a unique number for such retrieval in the preferred embodiment.

In an embodiment of this invention, viseme transitions stored in the database 220 are linear. In an alternate embodiment, the viseme transitions are non-linear, where these non-linear viseme transitions are used to produce smoother dynamics between viseme images than the linear transitions for a more photo-realistic talking face. Non-linear viseme transitions can be spline motions from pixel to corresponding pixel between frames or any other form of motion-smoothing trajectory that can be used to smoothen viseme transitions.

In a preferred embodiment, viseme transitions are performed using morphing techniques, where these morphing techniques result in a smooth transition between viseme images. To understand the morphing technique used in an embodiment of this invention, the ideas of forward warping, reverse warping, hole filling and blending must be understood.

Given two viseme images, A and B, and the computed corresponding vectors $D_x^{A \to B} D_y^{A \to B}$ between them, the first step of the morphing method is to forward warp A along $D_x^{A \to B}$ and $D_y^{A \to B}$. This forward warping method "pushes" the pixels of A along the flow vectors. By scaling the computed flow vectors uniformly by a constant between 0 and 1, one can produce a series of warped intermediate images which approximate the transformation between visemes A and B. Several such intermediate warps are shown in FIG. 7.

Figure 7:
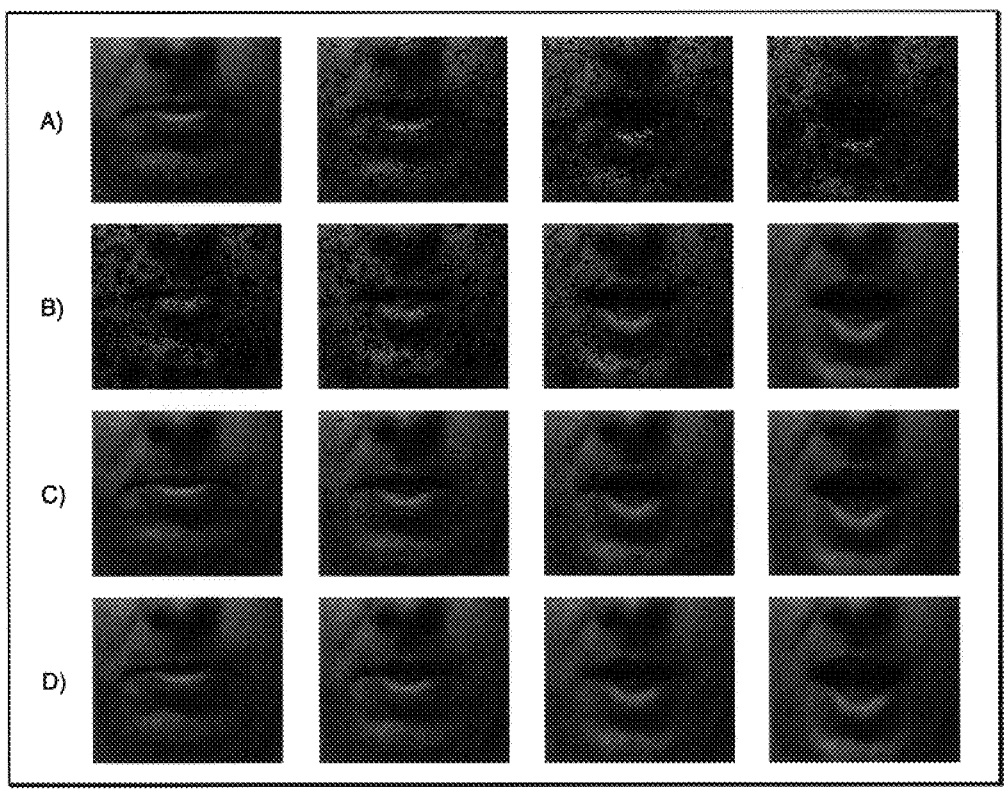
FIG. 7 shows morphing as applied to the TTVS of FIG. 1.

Illustrated in the top row of FIG. 7 are intermediate images/warps from forward warping viseme A (first) image to viseme B without hole filling. Illustrated in the second row (labeled B) are intermediate images/warps from forward warping viseme A (first image) towards B, with hole filling. Illustrated in the third row (labeled C) are intermediate images/warps from forward warping viseme B (last image) towards A, with hole filling. Illustrated in the fourth row (labeled D) is a morph between viseme A and viseme B.

The black holes that appear in the intermediate images shown in FIG. 7, row, occur in cases where a destination pixel is not filled in with any source pixel value. One reason for this is that the forward warping method rounds to the nearest integer when it decides which destination pixel to fill. Another reason is that local image expansion involved in the underlying motion of the lips causes the optical flow vectors themselves to diverge.

To remedy this, a hole-filing method first produced by Chen & Williams (see S. E. Chen and L. Williams, "View Interpolation for Image Synthesis," in *SIGGRAPH* '93 Proceedings, pages 279–288, Anaheim, Calif., August 1993.) has been adopted for this invention. The method pre-fills the destination images with a special reserved background color. After performing the forward warp, the hole-filling method traverses the destination image in rasterized order and fills in the holes by interpolating linearly between their non-hole end points. FIG. 7, row B shows the same set of warped intermediates as in FIG. 7, row A, but with the holes filled in using the described method.

Because forward warping can only move pixels around, it cannot model the appearance of new pixel texture. As is evident from the sequence in FIG. 7, row B, a forward warp of viseme A along the flow vectors can never produce a final image that looks like viseme B since viseme B contains a large amount of novel texture from the inside of the mouth.

Morphing overcomes this "novel pixel texture" problem because it involves two warps, one from a starting viseme to the intermediate point, and another from the ending viseme to the same intermediate point. The two warped images are subsequently scaled by respective blending parameters and then added to produce the final morphed image. By interpolating the blending parameters, the morph "fades out" the warped versions of the starting viseme and "fades in" the warped versions of the ending viseme. The blending process thus allows the two warps to be effectively combined and the "new" pixels of the second viseme to become involved in the viseme transition itself.

Accordingly, a second warp in a morph is employed and is a warp of viseme B towards viseme A, in which an inverse flow from viseme B to viseme A is computed. In the present invention, the inverse flow is computed using a method that was first described in Beymer, Shashua, and Poggio, (see D. Beymer, A. Shashua, and T. Poggio, "Example based Image Analysis and Synthesis," *A.I. Memo No.* 1431, Artificial Intelligence Laboratory, Massachusetts Institute of Technology, 1993). FIG. 7, row C depicts the set of images generated as a result of warping along the inverse flow from viseme B to viseme A.

A final morph sequence is shown in FIG. 7, row D. The blending parameter is interpolated linearly between 0.0 and 1.0. In an alternate embodiment, the blending parameter is interpolated non-linearly, as described above.

Figure 5:
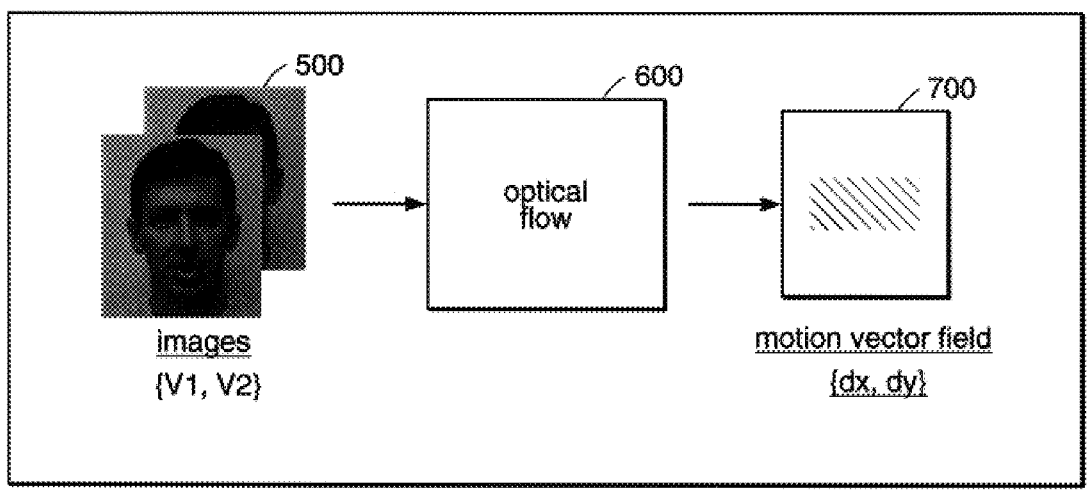
FIG. 5 shows the motion interpolation vector fields used by the present invention for interpolation resulting from passing starting and ending images into an optical flow automation routine that computes correspondence from each viseme to every other viseme.

The following pseudocode further describes the morphing process just discussed and illustrated in FIGS. 5 and 7.

Figure 8:
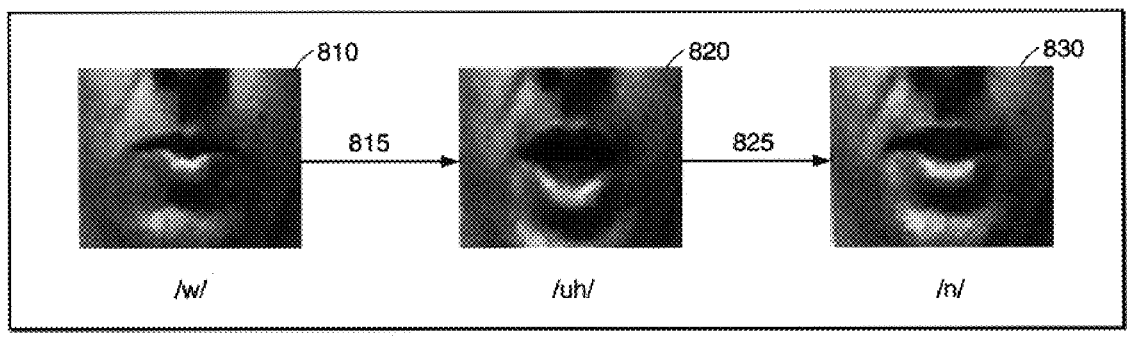
FIG. 8 shows a concatenation of visemes used to produce the word "one."

% Compute flow from A to B
$d_x, d_y \leftarrow$ COMPUTE_FLOW (A,B)
% Compute inverted flow from B to A
$d_x^{-1}, d_y^{-1} \leftarrow$ INVERT_FLOW ($d_x, d_y$)
% Forward warp A by
$A_w \leftarrow$ FORWARD_WARP (A, $d_x, d_y$)
% Forward warp B by (1−)
$B_w \leftarrow$ FORWARD_WARP (B, (1−) $d_x^{-1}$, (1−)$d_y^{-1}$)
% Hole-filling
$A_h \leftarrow$ HOLE_FILL ($A_w$)
$B_h \leftarrow$ HOLE_FILL ($B_w$)
% Blending or Cross-dissolve
M ← (1−) $A_h + B_h$ To construct a visual stream in which a word or sentence is uttered, the appropriate viseme transitions are simply concatenated together. FIG. 8 is illustrative. In the illustrative example, the word "one" has a phonetic transcription of \w-uh-n\ and has a corresponding visual image of the utterance formed of the two viseme transitions, \w-uh\ and \uh-n\. Recall that in the present invention interpolation database and corpus, the viseme transitions for \w\ is the first viseme of the second row in FIG. 3, for \uh\ is the first viseme in the second row of FIG. 4, and for \n\ is the third viseme of the second row of FIG. 3. FIG. 8 illustrates the visemes 810, 820, 830. FIG. 8 illustrates the \w\ viseme 810 transitioning 815 into \uh\ viseme 820 and the \uh\ viseme 820 transitioning 825 into the \n\ viseme 830. Note that because the \uh\ viseme image 820 is the same image in both viseme transitions \w-uh\ 815 and \uh-n\ 825, the transition between these two viseme transitions is smooth. As a result, the viseme transitions \w-uh\ 815 and \uh-n\ 825 are concatenated, or put together and played seamlessly one right after the other. The transition between viseme transitions is smooth because the \uh\ 820 viseme image is the same image in both viseme transitions.

The last step in creating the photo-realistic talking face is synchronizing the talking face image with the audio-speech (phoneme) stream by employing the interpolation vectors and visemes contained in the interpolation database 220. The synchronizing of phoneme and viseme combinations to match the input text 100 stream results in giving the impression of a photo-realistic talking face.

This synchronizing comprises the steps of concatenating a plurality of viseme transitions, as discussed above with FIG. 8, to produce a complete visual utterance, and extracting from a text-speech synthesizer phoneme and timing information. The phoneme and timing information is used to determine which viseme transitions from th database 220 to use and at what rate these viseme transitions should occur to synchronize the visemes with the phonemes such that the input text 100 of the TTAVS 200 system results in a photo-realistic talking face.

In one embodiment of this invention, the Festival TTS system (A. Black and P. Taylor, "The Festival Speech Synthesis System," University of Edinburgh, 1997.) developed at the University of Edenberg is used. However, any TTS system that results in realistic quality speech may be used. A voice in the Festival system consists of a set of recorded diphones, which are stored as LPS coefficients and corresponding residuals (M. J. Hunt, D. A. Zwierzynski, and R. Carr, "Issues in High Quality IPC Analysis and Synthesis," in *Proceedings of Eurospeech,* volume 2, pages 348–351, Paris, France, 1989.). It is interesting to note that the final audio speech stream 300 is constructed by concatenating appropriate diphones together.

The Festival TTS system models speech production using the traditional source-filter model in which a pitch impulse train is modulated by a vocal transfer function. This model has been historically important for speech synthesis because it effectively isolates the intonation and duration information, captured by the pitch impulse train, from the phonemic information, captured by the vocal filter.

The TTS system thus takes as input a typed sentence and computes as an intermediate representation the desired pitch train with which to excite the vocal transfer function. For each pitch impulse in the train, the TTS system determines its length in samples, and the diphone filter which it will excite. For example, the pitch train for the word bed contains a series of impulses that excite various consecutive portions of the diphone \b-e\, followed by a series of impulses that excite various consecutive portions of the diphone \e-d\.

The information contained in the pitch impulse train is sufficient for creating a visual speech stream in close synchrony with the audio output 300 stream. A new viseme image is placed at every pitch impulse which excites a diphone different from the previous. So, the \e\ viseme in the "bed" example would be placed at the position c the first pitch impulse which transitions between the \b-e\ and \e-d\ diphones.

The number of frames to morph is determined by counting the total length in samples of all the pitch impulses between any two viseme images. This sample total is divided by the audio sampling rate (16 kHz) to determine the duration of a viseme transition in seconds. Multiplication by the desired video frame rate (60 fps) then determines the number of needed frames of the viseme transition/corresponding image.

One will find that the use of TTS timing and phonemic information in this manner produces superb quality lip synchronization between the audio 300 and the video 400 halves of the invention TTVS system output. The drawback of using a TTS system, however, as opposed to a recorded natural speech signal that is manually annotated, is that the audio 300 may have a slightly 'robotic' quality to it. Nevertheless, the flexibility of having the described TTVS 200 system produce audio visual output for any typed text will offset any misgivings one might have regarding final audio quality. It is believed that future generations of TTS systems will continue to achieve better levels of audio quality.

Figure 9:
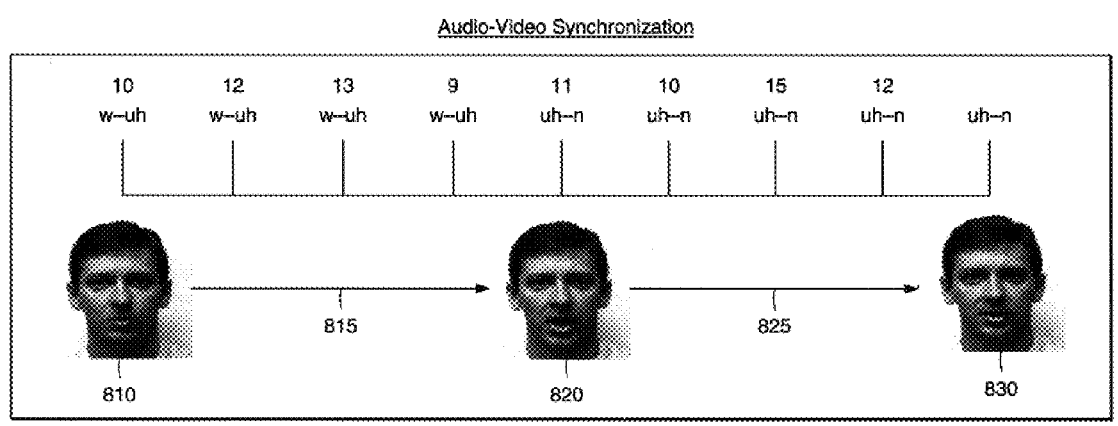
FIG. 9 shows an example of a final audio-visual synchronization with time codes used to produce a photo-realistic talking face speaking the word "one."

An example of speaking the word "one" is illustrated in FIGS. 8 and 9. FIG. 8 shows a closeup of the mouth positions shown in each frame. The arrows 815, 825 between each frame indicate a viseme transition between the consecutive visemes 810, 820, 830 shown in each frame. Therefore, a visual word utterance is created by concatenating the viseme transitions between the consecutive visemes 810, 820, 830 in a word.

FIG. 9 shows the same word "one" with a time scale shown above the viseme in the frames and the viseme transitions represented by arrows. The time codes represented by the integers located above the phonetic representations shown above the time interval lines (on the graph above the viseme images) are time codes representing lengths of time necessary to produce each sound. These numbers can be used as the in the morphing technique discussed above. In a preferred embodiment of this invention, these integers relate to real time values of time. By playing the synchronize visemes and phonemes with these real-time values as timing information, a photo-realistic talking face played in real-time is produced. The final display is produced by appropriate audio and video 400 means (speakers/sound system, display monitor, computer I/O assembly, etc.) necessary to exhibit the photo-realistic talking face uttering the input text 100 in the present invention system.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of converting input text into an audio-visual speech stream comprising a talking face image enunciating the text, wherein said audio-visual speech stream comprises a plurality of phonemes and timing information, wherein the tallking face image is built using a plurality of visemes, the method comprising the steps of:

recording a visual corpus of a human-subject;

extracting and defining a plurality of visemes from the recorded visual corpus, said visemes being defined by a set of images spanning a range of mouth shapes derived from the recorded visual corpus;

building a viseme interpolation database, said database comprising a plurality of viseme images and at least one set of interpolation vectors that define a transition from each viseme image to every other viseme image, said viseme images in said interpolation database being a subset of said plurality of visemes extracted from said visual corpus, said set of interpolation vectors being computed automatically (i, in the absence of a definition of a set of high-level features and (ii) through the use of optical flow methods, said viseme interpolation database further comprising a corresponding set of intermediate viseme images automatically generated as a function of respective interpolation vectors; and synchronizing the talking face image with an input text stream by employing said interpolation vectors and viseme images contained in said interpolation database, said synchronizing resulting in giving the impression of a photo-realistic talking face.

2. The method of claim 1 wherein said human-subject enunciates a set of key words, said set of key words being specifically designed to elicit at least one instantiation of each viseme.

3. The method of claim 2 wherein said set of key words comprises the step of enunciating between 40 and about 50 words from the english language.

4. The method of claim 1 wherein recording a visual corpus of a human-subject results in an optical recording of a three dimensional image of said human-subject, said three dimensional image having a plurality of three dimensional image properties capable of being altered.

5. The method of claim 4 wherein said three dimensional image properties are selected from a group consisting of lighting, shadowing, depth of field, focus, sharpness, color balance, grey scale, saturation, brightness, field of view, and cropping.

6. The method of claim 1 wherein building a viseme interpolation database comprises the steps of:
identifying each viseme as corresponding to a phoneme; and
extracting a plurality of visemes from said visual corpus.

7. The method of claim 6 wherein identifying each viseme comprises the steps of:
searching through said recording; and
relating each viseme on each recorded frame of said recording to a phoneme.

8. The method of claim 7 wherein the steps of searching and relating are performed manually.

9. The method of claim 7 wherein said relating each viseme comprises the steps of:
subjectively rating each viseme and phoneme combination; and
selecting a final set of visemes from among said rated viseme and phoneme combinations.

10. The method of claim 9 further comprising the step of attaching attributes to each viseme, said attributes defining characteristics of said human-subject.

11. The method of claim 10 wherein said characteristics of said human-subject are selected from a group consisting of eye position, eyelid position, head angle, head tilt, eyebrow position, shoulder position, posture, overall position within the frame.

12. The method of claim 10 wherein said attributes are used to separate the visemes into a plurality of viseme sets, said plurality of viseme sets containing about the same visemes, said plurality of viseme sets facilitating a reduction of repetitive movements thereby resulting in giving the impression of a more photo-realistic talking face.

13. The method of claim 6 further comprising the step of logging said plurality of visemes to a recording medium.

14. The method of claim 6 wherein extracting a plurality of visemes from said visual corpus results in at least one set of 16 visemes.

15. The method of claim 14 wherein a set of interpolation vectors define two hundred fifty-six viseme transitions.

16. The method of claim 1 wherein said viseme transitions are non-linear, said non-linear viseme transitions producing smooth dynamics between viseme images for a more photo-realistic talking face.

17. The method of claim 1 wherein said viseme transitions are performed using morphing techniques, said morphing techniques resulting in a smooth transition between viseme images for a more photo-realistic talking face.

18. The method of claim 1 wherein said synchronizing comprises the steps of:
concatenating a plurality of viseme transitions, said concatenating resulting in a complete visual utterance; and
extracting from a text-to-speech synthesizer phoneme and timing information, said phoneme and timing information being used to determine which viseme transitions from said database to use and what rate at which viseme transitions should occur.

19. The method of claim 18 further includes displaying the photo-realistic talking face in real time.

20. The method according the claim 1, wherein automatically generating the intermediate viseme images employs warping.

21. The method according to claim 20, wherein automatically generating the intermediate viseme images employs hole filling.

22. The method according to claim 21, wherein automatically generating the intermediate viseme images employs blending.

23. The method according to claim 1, wherein automatically generating the intermediate viseme images employs morphing.

24. The method according to claim 1, wherein the intermediate viseme images are located along respective interpolating vectors that define a transition from one viseme image to another viseme image.

25. The method according to claim 1, wherein the intermediate viseme images are located along new interpolation vectors computed as a function of respective computed interpolation vectors.

26. The method according to claim 25, wherein the new interpolation vectors are respective linear combinations of said computed interpolation vectors.

27. A system for generating and displaying a talking facial display comprising:
a computer;
an image source in electrical communication with the computer to transfer input images of a human-subject to the computer, the input images composing a visual corpus;
a text data source in electrical communication with the computer to transfer input text to the computer, the input text composing a text stream; and
processor routines executed by the computer, the processor routines comprising instructions to:
(i) build a viseme interpolation database, said database comprising a plurality of viseme images and at least one set of interpolation vectors that define a transition from each viseme image to every other viseme image, said viseme images in said interpolation database being a subset of a plurality of visemes extracted from said visual corpus, said set of interpolation vectors being computed automatically (i) in the absence of a definition of a set of high-level features and (ii) through the use of optical flow methods, said viseme interpolation database further comprising a corresponding set of intermediate viseme images automatically generated as a function of respective interpolation vectors; and (ii) synchronize an image of a talking face with the text stream by employing said interpolation vectors and viseme images contained in said interpolation database, said synchronizing resulting in giving the impression of a photo-realistic talking face.

28. The system of claim 27 further comprising an audio input source in electrical communication with the computer to transfer words spoken by the human-subject into the computer for processing by the processor routines to obtain voice information used to generate the audio from the input text.

29. The system of claim 28 wherein the audio input source and the image source are produced by a video camera that captures audio and video of the human-subject speaking words.

30. The system of claim 27 wherein the processor routines comprise a text-to-speech system to convert the input text into audio information that is used by the processor routines to synchronize mouth movements by the human-subject with the audio information photo-realism.

31. The system of claim 27, wherein the processor routines include instructions employing at least one motion estimation technique to compute said set of interpolation vectors automatically.

32. The system of claim 31 wherein the motion estimation technique comprises optical flow routines that automatically generate the intermediate viseme images stored in the database.

33. The system of claim 31 wherein the audio-visual routines comprise interpolation routines that use the transition data stored in the database for making smooth transitions from image to image by the talking face.

34. The system of claim 33 wherein the interpolation routines comprise morphing routines to create a more photo-realistic talking face.

35. The system according to claim 27, wherein the processor routines further comprise instructions to automatically generate the intermediate viseme images by employing warping.

36. The system according to claim 35, wherein the processor routines further comprise instructions to automatically generate the intermediate viseme images by employing hole filling.

37. The system according to claim 36, wherein the processor routines further comprise instructions to automatically generate the intermediate viseme images by employing blending.

38. The system according to claim 27, wherein the processor routines further comprise instructions to automatically generate the intermediate viseme images by employing morphing.

39. The system according claim 27, wherein the intermediate viseme images are located along respective interpolation vectors that define a transition from one viseme image to another viseme image.

40. The system according to claim 27, wherein the intermediate viseme images are located along new interpolation vectors computed as a function of respective computed interpolation vectors.

41. The system according to claim 40, wherein the new interpolation vectors are respective linear combinations of said computed interpolation vectors.

* * * * *